United States Patent [19]

Schechter et al.

[11] Patent Number: 5,081,865
[45] Date of Patent: Jan. 21, 1992

[54] CENTER OF GRAVITY LOCATING METHOD

[75] Inventors: Stuart E. Schechter, Waltham; Antonio R. Leyenaar, Lexington, both of Mass.

[73] Assignee: The United States of America as represented by the Secretary of the Air Force, Washington, D.C.

[21] Appl. No.: 546,324

[22] Filed: Jun. 29, 1990

[51] Int. Cl.⁵ ............................................. G01M 1/12
[52] U.S. Cl. ............................................. 73/65; 73/483
[58] Field of Search ............................. 73/65, 483, 486

[56] References Cited

U.S. PATENT DOCUMENTS

| | | | |
|---|---|---|---|
| 3,174,330 | 3/1965 | Boundy | 73/65 |
| 3,320,795 | 5/1967 | Monroe et al. | 73/65 |
| 3,388,589 | 6/1989 | Campbell | 73/65 |
| 4,726,222 | 2/1988 | Schueller | 73/65 |

FOREIGN PATENT DOCUMENTS

| | | | |
|---|---|---|---|
| 0845032 | 7/1981 | U.S.S.R. | 73/483 |
| 1310649 | 5/1987 | U.S.S.R. | 73/65 |

Primary Examiner—Charles A. Ruehl
Attorney, Agent, or Firm—Irwin P. Garfinkle; Donald J. Singer

[57] ABSTRACT

A system is provided for determining the center of gravity of a body by providing a balance arm supported from a single pivot point, then positioning the body on the balance arm and measuring the rotation of the balance arm in two orthogonal planes. A disturbance weight is then added to the system at a known position, and the angle of rotation in the two planes is again measured. Using the known weights of the body and the disturbance weight, and the known distance of the disturbance weight from the pivot, and the measured angles, the precise location of the center of gravity of the body is determined by basic statics and standard trigonometry.

2 Claims, 2 Drawing Sheets

CENTER OF GRAVITY LOCATING METHOD

STATEMENT OF GOVERNMENT INTEREST

The invention described herein may be manufactured and used by or for the Government for governmental purposes without the payment of any royalty thereon.

This invention relates to a device with which one can determine statically and with great accuracy, the center of gravity of a body, not limited to a specific geometry, by using an offset (known disturbance weight), through angular displacement of the device in two orthogonal planes.

BACKGROUND OF THE INVENTION

When satellites are launched into a geostationary orbit they typically go through a variety of stages prior to reaching a permanent station. This includes being launched into a transfer orbit before being "kicked" into the final geostationary orbit. To keep the satellite stable during the transfer (i.e. to keep the satellite from tumbling, rocking or wobbling) the vehicle is spin stabilized. This is done by on-board jets which spin the spacecraft to about 60 RPM about its flight axis.

The mechanical basis for spin stabilization is that an object spinning about one of the stable principle axes is relatively insensitive to small external disturbances. This is because the angular momentum vector is aligned with a principle axis and small disturbances will deviate the vector only slightly off axis. These are called stability points of a system.

To create this stable spin axis, the vehicle must be fairly well balanced. Any eccentricity could cause the spacecraft to wobble or even tumble. Knowledge of the center of gravity allows the satellite to be balanced for spin stabilization during orbital transfer.

The prior art shows many ways of determining center of gravity. For example, U.S. Pat. No. 4,726,222 issued to Schueller on Feb. 23, 1988, shows a fixture for determining the center of gravity of a torpedo which includes a cradle suspended pendulously in a support. The cradle has a pair of rollers grooved to receive the torpedo, and is provided with means for manually rotating the roller to displace the torpedo axially until the cradle becomes level in the support when the center of gravity may be observed or marked on the torpedo.

U.S. Pat. No. 3,388,589 issued to Campbell on June 18, 1968 discloses a center of gravity determining device which has a platform that is balanced in a horizontal position with a specimen thereon such that a vertical imaginary line passes through the center of gravity of the specimen and the platform so that marking means can be used to mark the upper and lower surfaces of the sample where the imaginary line passes through the specimen center of gravity.

U.S. Pat. No. 3,320,795 issued to Monroe et al on May 23, 1967 measures center of gravity by means of a device which utilizes counterweight on a balanced platform to re-balance the platform after the specimen has been placed on it.

U.S. Pat. No. 3,174,330 issued to Boundy on Mar. 23, 1965 provides apparatus which is used to locate the center of gravity of an object such as a missile in a manner which avoids the introduction of extraneous forces and effects other associated with the apparatus.

The hereinafter disclosed invention was required because of the need for finding the center of gravity of the so-called FLTSATCOM satellite. Motivation for the new method of determining the center of gravity of the satellite was derived from some of the special problems the module posed. One problem was that the module was not structurally stable enough to be tipped on end for balance measurements. The other problem was that the satellite package had an oscillator that had to be powered, and the power could be removed for only very short periods of time without disrupting the electronics. Therefore, some new way had to be found to measure the center of gravity, which was very accurate and, in addition, very easy and fast to operate. In accordance with this invention, static imbalance is used.

There are typically three methods of measuring the center of gravity of a volume statically. They include hanging the object from a wire, reaction measurement of the object and balance of the object on a pivot.

The hanging method is the simplest to perform when the object is small and accuracy is not important. When the subject of the experiment is hung from a wire, the center of gravity of the system lies along a line subtended by the wire. This means that if three measurements are made at three arbitrary locations, all three of the derived lines will intersect at the center of gravity.

The reaction measurement method relies on weighing the object with load cells and summing the moments about known locations to derive the center of gravity.

The balance method requires that the object be free to pivot about some known point. A restoring force is then applied to the object to level the pivot. By knowing the restoring force, the center of gravity may be calculated. The restoring force is typically a hanging weight or hydraulic piston.

None of the prior art known to the applicants was capable of meeting the requirements of applicant's system.

OBJECTS OF THE INVENTION

The design of the center of gravity locator of the present invention required (1) the development of the governing equations. This consisted of analyzing the geometry of a static balance system and applying mass balance equations to this geometry; (2) providing mechanical apparatus needed for the specific measurement; and (3) developing the software to produce the center of gravity coordinates.

It is an object of this invention to provide a static system for determining the center of gravity of a complex object by first suspending the object from a single pivot point and then providing a known disturbance weight at a known location, and measuring the angular displacement of the object in two orthogonal planes.

Another object of this invention is to balance a complex body with an unknown center of gravity on a balance, and measure the rotation of the balance in two orthogonal planes, and thereafter placing a known disturbance weight at a known location and again measuring the balance rotation to provide the data required for accurate determination of the center of gravity.

BRIEF DESCRIPTION OF THE DRAWINGS

For further objects and for a better understanding of the invention, reference should no be made to the following detailed specification and to the accompanying drawing in which.

DESCRIPTION OF A PREFERRED EMBODIMENT OF THE INVENTION

This invention provides a mechanism with which one can determine, statically, and with great accuracy, the center of gravity of a body, not limited to a specific geometry, by using an offset known disturbance weight, through angular displacement of the of the system in two orthoganal planes. The system found application in determining the center of gravity of a satellite intended for launching into space.

Figure 1:
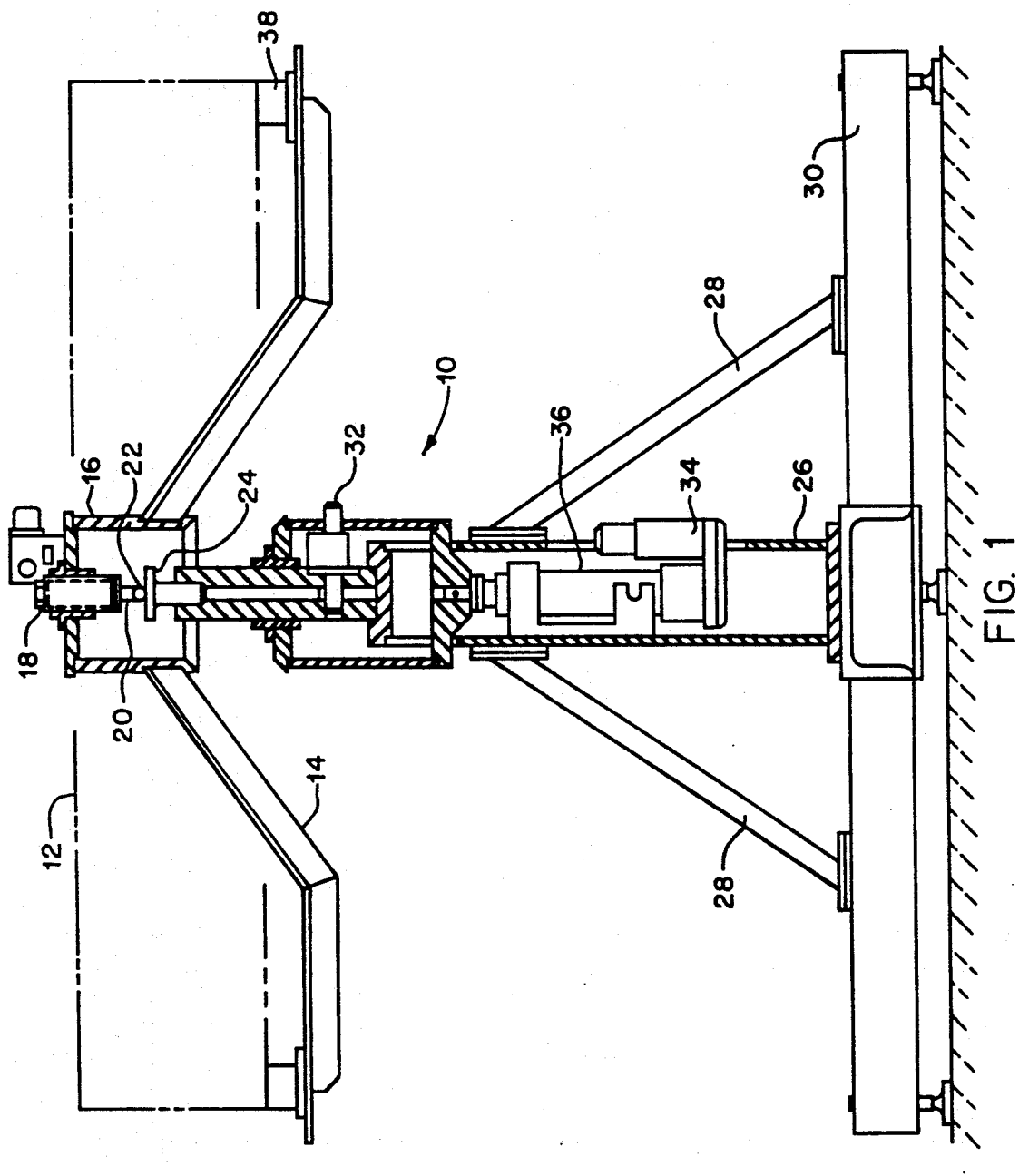
FIG. 1 illustrated the mechanism used in accordance with this invention.

FIG. 1 schematically represents the balance apparatus 10 for determining the center of gravity of a body 12, which in the case actually reduced to practice, was a space module. Although not shown in the drawing, in actual practice, the balance apparatus 10 supports the body 12 at 6 equally spaced locations on support arms 14. The support arms 14 are attached to a housing 16 which carries a bearing 18. A shaft 20, supported within the bearing 20 carries a ball 22 which provides the sole support of the system when lowered on to a planar platform 24 at the top of a support column 26. The column is, in turn, supported by means of legs 28 on a platform 30. The support column 26 carries a transducer 32 for measuring the weight on the ball 22. A stowing mechanism 34, actuated by a piston actuator 36, serves to relieve the forces on the transducer 32 when the weight measurements are not being made.

Before the body 12 is placed on the arms 14, the balance apparatus 10 is in its initial, or balanced position, inclinometers (not shown in FIG. 1) for measuring the inclination of the apparatus 10 with respect to its X, Y, and Z axes are adjusted to zero. The body 12 is then placed on the support arms 14. At this point the inclinometers are read and the weight of the body 12 is determined by means of the transducer 32.

A disturbance mass 38, of known weight, is secured to the end of one of the arms 14 at a known distance from the axis of rotation of the ball 22. Again, the inclinometer readings are taken. From the two sets of angle measurements, and using moment balance equations, the center of gravity of the body is calculated.

At the heart of the equation development is the geometry of a system in which an object is balanced on a pivot. At equilibrium, the local coordinate system rotates on the pivot until the center of gravity lies directly below the origin. If a disturbance mass is then added to the system, the geometry will change and the local coordinate system will rotate to a new equilibrium with the new center of gravity again below the pivot. If the disturbance mass is considered a point mass and the location of this point mass is known, then from mass balance equations, the original center of gravity location can be derived.

Figure 2A:
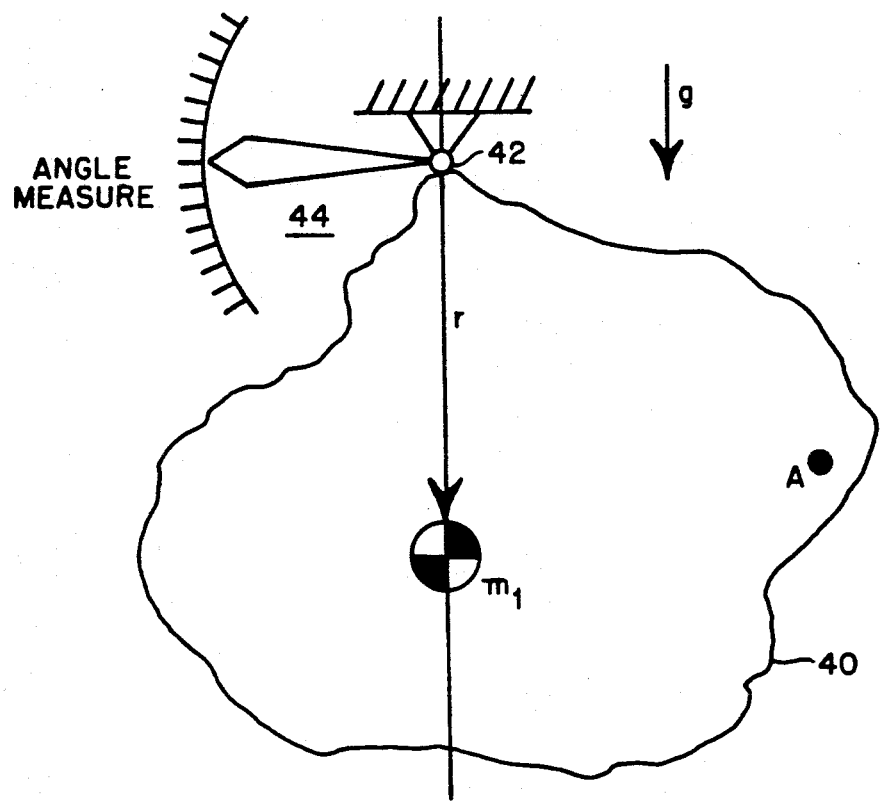
FIGS. 2a and 2b are sketches illustrating the geometry of the invention in two dimensions.
Figure 2B:
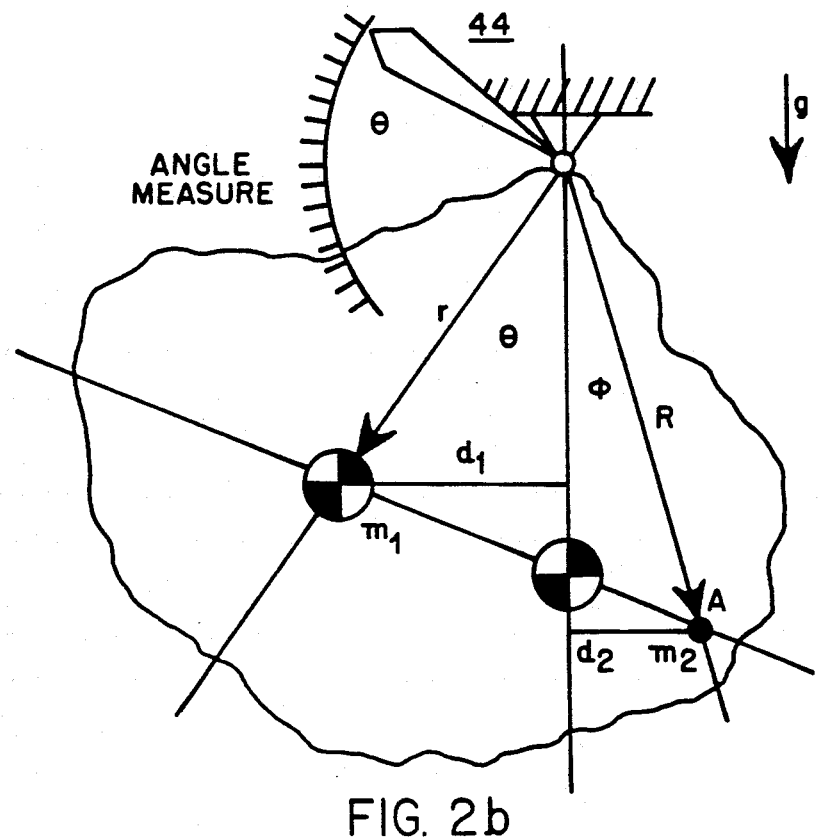
Figure 3:
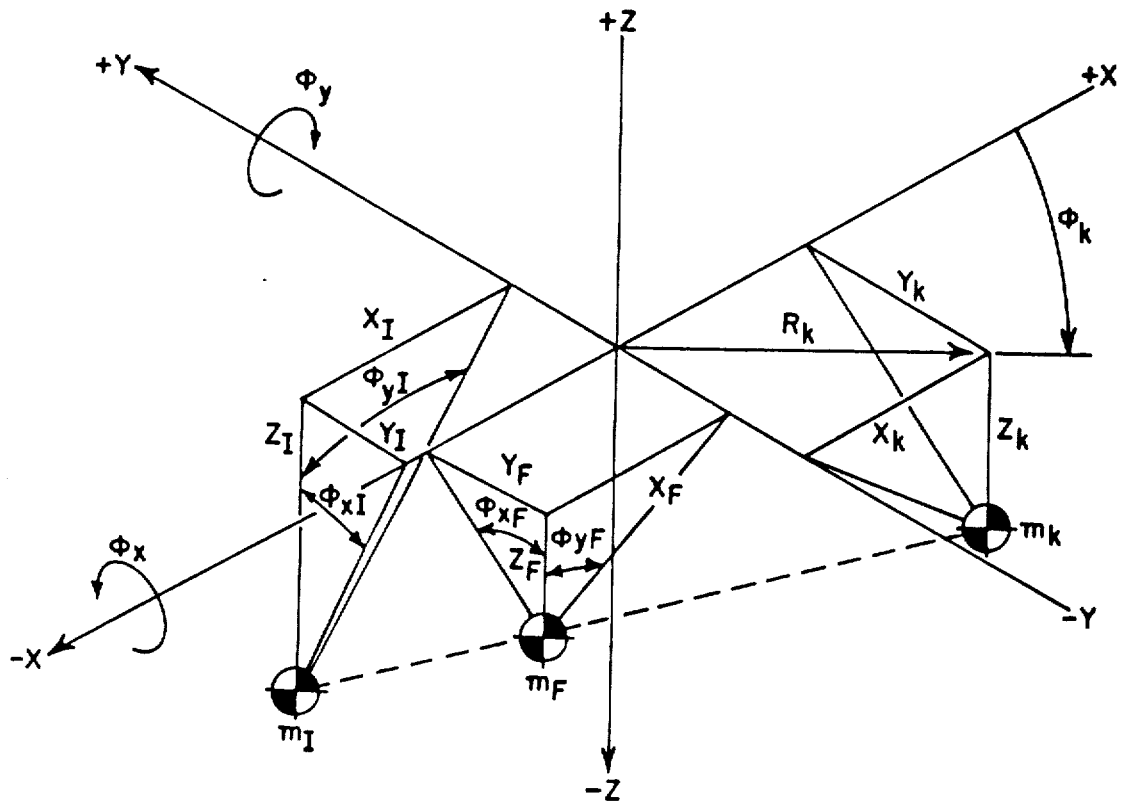
FIG. 3 is a sketch illustrating the geometry of the invention in three dimensions.

Before deriving the equations for the three-dimensional system illustrated in FIG. 3, it may be useful first to explain the geometry of the two-dimensional example shown in FIGS. 2a and 2b.

Referring to FIG. 2a, an arbitrarily shaped body 40 is suspended from a pivot 42 in a gravity field g. The center of gravity of the body 40 will lie directly below the pivot point at some distance r from the pivot. This distance r to the center of the body mass $m_1$ is what needs to be determined. Referring to FIG. 2b, adding a disturbance mass $m_2$ at point A will cause the body 40 to rotate through angle "$\theta$". This angle is measured by an inclinometer 44. The location of point A is known from the known distance R and the measured angle "$\phi$". The resulting center of gravity resides directly below the pivot and from equilibrium equations the distance d1 may be determined.

$$d_1 = \frac{m_2}{m_1} d_2$$

or:

$$d_1 = \frac{m_2}{m_1} R \sin\phi$$

from the geometry:

$$r = \frac{d_1}{\sin\theta}$$

or:

$$r = R \frac{m_2}{m_1} \frac{\sin\phi}{\sin\theta}$$

where R, $m_2$ and $\phi$ are known and $m_1$ and $\theta$ are measured. The three-dimensional system shown in FIG. 1 explained by referring to FIG. 3 in which the following derivation is based on mass balance equations and geometry. The object is to calculate the unknown CG location $x_1$, $y_1$, $z_1$ from the measured quantities $m_1$, $\phi_{x1}$, $\phi_{y1}$, $\phi_{xF}$, $\phi_{yF}$.

Starting with the mass balance equations:

$$x \sum_i m_i = \sum_i x_i m_i$$

$$y \sum_i m_i = \sum_i y_i m_i$$

$$z \sum_i m_i = \sum_i z_i m_i$$

for this case, the above expands to:

$$x_F m_F = x_I m_I + x_k m_k \tag{1}$$

$$y_F m_F = y_I m_I + y_k m_k \tag{2}$$

$$z_F m_F = z_I m_I + z_k m_k \tag{3}$$

dividing equation (1) by equation (2):

$$\frac{x_F}{y_F} = \frac{x_I m_I + x_k m_k}{y_I m_I + y_k m_k}$$

clearing the denominators and factoring out the mass terms:

$$m_I(x_F y_I - y_F x_I) = m_k(y_F x_k - x_F y_k) \tag{4}$$

divide equation (4) by $Z_F$ and multiply the left side by $z_I/Z_I$ and the right side by $R_k/R_k$:

$$m_I z_I \left[ \frac{x_F}{z_F} \frac{y_I}{z_I} - \frac{y_F}{z_F} \frac{x_I}{z_I} \right] = \tag{5}$$

-continued $$m_k R_k \left[ \frac{y_F}{z_F} \frac{x_k}{R_k} - \frac{x_F}{z_F} \frac{y_k}{R_k} \right]$$

from geometry:

$$\frac{x_I}{z_I} = \tan\phi_{yI} \qquad \frac{y_I}{z_I} = \tan\phi_{xI} \qquad (6)$$

$$\frac{x_F}{z_F} = \tan\phi_{yF} \qquad \frac{y_F}{z_F} = \tan\phi_{xF}$$

$$\frac{x_k}{R_k} = \cos\phi_k \qquad \frac{y_k}{R_k} = \sin\phi_k$$

substituting equations (6) into equation (5) and solving for $z_I$:

$$z_I = \frac{m_k}{m_I} R_k \left[ \frac{\tan\phi_{xF}\cos\phi_k - \tan\phi_{yF}\sin\phi_k}{\tan\phi_{xI}\tan\phi_{yF} - \tan\phi_{xF}\tan\phi_{yF}} \right] \qquad (7)$$

and there follows:

$$x_I = z_I \tan\phi_{yI} \qquad (8)$$

$$y_I = z_I \tan\phi_{xI} \qquad (9)$$

where $R_k$, $m_k$ and $\phi_k$ are known and $m_I$, $\phi_{xI}$, $\phi_{yI}$, $\phi_{xF}$ and $\phi_{yF}$ are measured.

Equations (7), (8) and (9) show that by measuring an initial angular condition of an object on a pivot, and by adding a disturbance mass and measuring a final angular position, it is possible to calculate the original center of gravity.

In practice, these equations are set into a computer for the rapid calculation of the center of gravity of the body.

It will be apparent that the particular apparatus used for calculating the center of gravity of an irregular body may be varied in many ways. For example, instead of balancing the support arms 14 on the pivot 22, the support arms may be suspended from a point as illustrated in the example of FIGS. 2a and 2b. It is intended therefore, that this invention be limited only by the following claims as interpreted in the light of the prior art.

What is claimed is:

1. A method for determining the center of gravity of an irregular body having a known weight comprising the steps of:
   providing a support balanced in an initial position on a single point;
   mounting said body on said support whereby said support will rotate to a second position, the center of gravity of said body being located along a vertical line extended from said point;
   measuring the angular rotation of said support from said initial position to said second position;
   placing a disturbance mass having a known weight and location on said support to rotate said support to a third position;
   measuring the angular rotation from said second position to said third position; and
   using the known weights of said body and said disturbance mass and the measured angles of rotation, calculating the location of said center of gravity.

2. The method as defined in claim 1, wherein said angles and said distances are measured in three dimensions.

* * * * *

UNITED STATES PATENT AND TRADEMARK OFFICE
CERTIFICATE OF CORRECTION

PATENT NO. : 5,081,865

DATED : 21 January 1992

INVENTOR(S) : Stuart E. Schechter et al

It is certified that error appears in the above-identified patent and that said Letters Patent is hereby corrected as shown below:

IN THE DRAWINGS

Change "Sheet 1 of 2" to --Sheet 1 of 3--.

Change "Sheet 2 of 2" to --Sheet 2 of 3--.

Add Sheet 3 of 3, attached hereto, which was omitted from the issued patent.

Signed and Sealed this

Twenty-fourth Day of August, 1993

*Attest:*

BRUCE LEHMAN

*Attesting Officer*     *Commissioner of Patents and Trademarks*

$m_I$ = MASS OF STRUCTURE WITH UNKNOWN CG $m_k$ = MASS OF DISTURBANCE WEIGHT $m_F$ = COMPOSITE MASS $\Phi_x$ = ROTATION ABOUT x- AXIS $\Phi_y$ = ROTATION ABOUT y- AXIS $R_k, \Phi_y$ = POSITION OF DISTURBANCE MASS IN x-y PLANE